United States Patent
Crudele et al.

(10) Patent No.: US 7,474,737 B2
(45) Date of Patent: Jan. 6, 2009

(54) TELECOMMUNICATIONS TEST PLUGS HAVING TUNED NEAR END CROSSTALK

(75) Inventors: Vinicio Crudele, Watertown, CT (US); Brian Celella, Southington, CT (US)

(73) Assignee: The Siemon Company, Watertown, CT (US)

( * ) Notice: Subject to any disclaimer, the term of this patent is extended or adjusted under 35 U.S.C. 154(b) by 1175 days.

(21) Appl. No.: 10/680,739

(22) Filed: Oct. 7, 2003

(65) Prior Publication Data

US 2004/0116081 A1   Jun. 17, 2004

Related U.S. Application Data

(60) Provisional application No. 60/417,812, filed on Oct. 10, 2002.

(51) Int. Cl.
*H04M 1/24* (2006.01)
*H04M 1/76* (2006.01)
*H01R 24/00* (2006.01)

(52) U.S. Cl. ............... 379/27.07; 379/19; 379/417; 439/676

(58) Field of Classification Search ............ 379/1.01, 379/19, 27.07, 414–417, 413.04; 439/620.11, 439/620.15, 620.17, 620.18, 676, 941
See application file for complete search history.

(56) References Cited

U.S. PATENT DOCUMENTS

| | | | |
|---|---|---|---|
| 4,412,715 A | 11/1983 | Bogese, II | |
| 5,478,252 A | 12/1995 | Lecomte et al. | |
| 5,692,925 A | 12/1997 | Bogese, II | |
| 5,766,027 A | 6/1998 | Fogg | |
| 5,905,637 A | 5/1999 | Su | |
| 5,967,801 A | 10/1999 | Martin et al. | |
| 5,971,812 A | 10/1999 | Martin | |
| 5,999,400 A | 12/1999 | Belopolsky et al. | |
| 6,113,400 A | 9/2000 | Martin et al. | |
| 6,196,880 B1 * | 3/2001 | Goodrich et al. | 439/676 |
| 6,276,943 B1 | 8/2001 | Boutros et al. | |
| 6,319,069 B1 | 11/2001 | Gwiazdowski | |
| 6,333,472 B1 * | 12/2001 | Weatherley | 174/262 |
| 6,336,827 B1 | 1/2002 | Akama et al. | |
| 6,354,865 B1 | 3/2002 | Bogese | |
| 6,418,195 B1 * | 7/2002 | Autry et al. | 379/21 |
| 6,464,541 B1 * | 10/2002 | Hashim et al. | 439/676 |
| 6,685,511 B2 | 2/2004 | Akama et al. | |
| 6,816,025 B2 | 11/2004 | Nguyen | |
| 6,893,296 B2 | 5/2005 | Aekins et al. | |
| 7,114,985 B2 | 10/2006 | Doorhy et al. | |
| 7,154,049 B2 * | 12/2006 | Celella et al. | 174/261 |
| RE39,546 E | 4/2007 | Phommachanh | |
| 7,201,618 B2 | 4/2007 | Ellis et al. | |
| 7,220,149 B2 | 5/2007 | Pharney | |

(Continued)

*Primary Examiner*—Quoc D Tran
(74) *Attorney, Agent, or Firm*—Cantor Colburn LLP

(57) ABSTRACT

A set of telecommunications test plugs. A first test plug has a first test plug printed circuit board having circuit traces for establishing first predefined near end crosstalk between at least two of pairs of wires. The first predefined near end crosstalk is at a first level of a first defined range. A second telecommunications plug has a second printed circuit board having circuit traces for establishing a second predetermined level of near-end crosstalk. The circuit traces are positioned to establish second predefined near end crosstalk between at least two of pairs of wires. The second predefined near end crosstalk is at a second level of a second defined range.

19 Claims, 1 Drawing Sheet

U.S. PATENT DOCUMENTS

| | | |
|---|---|---|
| 7,229,309 B2 | 6/2007 | Carroll et al. |
| 7,244,126 B2 | 7/2007 | Morana et al. |
| 2007/0105452 A1 | 5/2007 | Gerlach et al. |
| 2007/0190863 A1 | 8/2007 | Caveney et al. |
| 2007/0254530 A1 | 11/2007 | Martich et al. |

* cited by examiner

TELECOMMUNICATIONS TEST PLUGS HAVING TUNED NEAR END CROSSTALK

CROSS REFERENCE TO RELATED APPLICATIONS

This application claims the benefit of U.S. provisional patent application Ser. No. 60/417,812 filed Oct. 10, 2002, the entire contents of which are incorporated herein by reference.

BACKGROUND OF THE INVENTION

Improvements in telecommunications systems have resulted in the ability to transmit voice and/or data signals along transmission lines at increasingly higher frequencies. Several industry standards that specify multiple performance levels of twisted-pair cabling components have been established. The primary references, considered by many to be the international benchmarks for commercially based telecommunications components and installations, are standards ANSI/TIA/EIA-568-A (/568) Commercial Building Telecommunications Cabling Standard and 150/IEC 11801 (/11801), generic cabling for customer premises. The standards provide for differing levels of performance, and have been assigned to differing categories. For example, Category 3, 4 and 5 cable and connecting hardware are specified in both /568 and /11801, as well as other national and regional specifications. In these specifications, transmission requirements for Category 3 components are specified up to 16 MHZ. Transmission requirements for Category 4 components are specified up to 20 MHZ. Transmission requirements for Category 5 components are specified up to 100 MHZ. Category 5e standards have been adopted and Category 6 standards will be published in the new future.

The above referenced transmission requirements specify limits on near-end crosstalk (NEXT). Under TIA 568A, the contacts in a telecommunications plug are numbered sequentially 1-8 and are arranged in pairs represented by contacts 1-2, 3-6, 4-5 and 7-8. The TIA standards establish limits on pair-to-pair crosstalk for both category 5e and category 6.

Manufacturers of telecommunications connectors such as plugs and outlets are faced with the task of testing telecommunications connectors to meet standards such as category 5e and category 6. For example, outlets must be tested with plugs having various NEXT levels so that performance of the outlet is confirmed across the spectrum of category 5e and category 6 components. Unfortunately, providing test plugs with NEXT values across the category 5e and category 6 spectrum currently requires numerous test plugs and is time consuming.

Test plugs are currently terminated using a number of wires that enter a plug housing and are terminated at insulation displacement contacts (IDCs). The wires are originally arranged in twisted pairs, untwisted and routed into the plug. The untwisting causes variability between test plugs and is difficult to control. The particular arrangement of the wires after untwisting creates difference in NEXT values between pairs and thus makes it difficult and time consuming to produce test plugs having specific NEXT values between pairs. Given these difficulties, as many as 18 different test plugs may be needed to establish the needed NEXT values between pairs for testing both category 5e and category 6.

SUMMARY OF THE INVENTION

An embodiment of the invention is a set of telecommunications test plugs. A first test plug has a first test plug printed circuit board having circuit traces for establishing first predefined near end crosstalk between at least two of pairs of wires. The first predefined near end crosstalk is at a first level of a first defined range. A second telecommunications plug has a printed circuit board having circuit traces for establishing a second predetermined level of near-end crosstalk. The circuit traces are positioned to establish second predefined near end crosstalk between at least two of pairs of wires. The second predefined near end crosstalk is at a second level of a second defined range.

BRIEF DESCRIPTION OF THE DRAWINGS

Referring now to the drawings wherein like elements are numbered alike in the several FIGURES.

DESCRIPTION OF THE PREFERRED EMBODIMENTS

Figure 1:
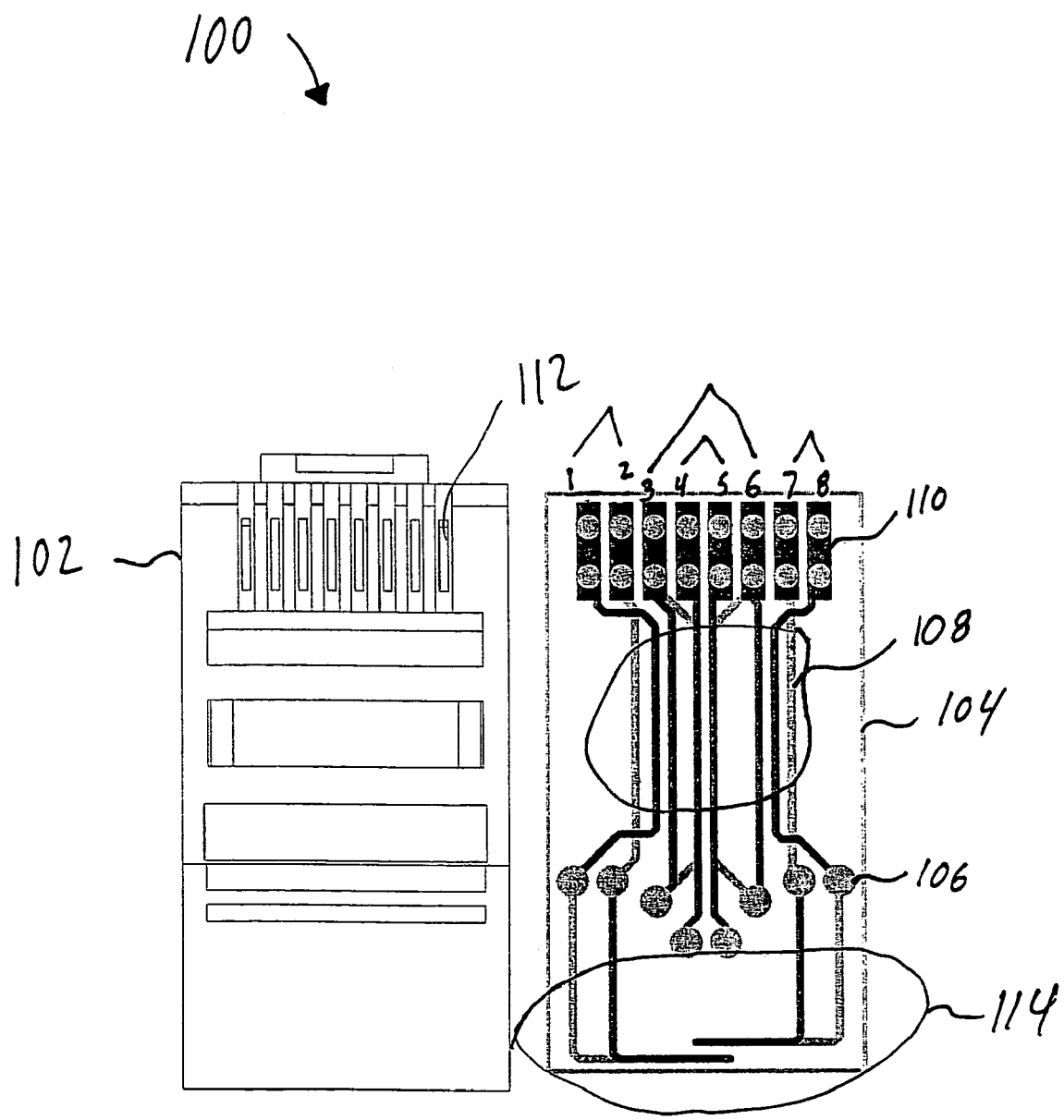
FIG. 1 illustrates components of a plug in one embodiment of the invention.

FIG. 1 illustrates components of a plug 100 in one embodiment of the invention. The plug 100 includes a plug housing 102 and a plug board 104. The plug board is a printed circuit board including wire connection points 106 such as plated through holes for receiving wires from a twisted pair cable. The wires may be soldered in through holes 106. Alternatively, the plug board 104 may include insulation displacement contacts for engaging the wires.

A number of primary circuit traces 108 lead from wire connection points 106 to contact pads 110. The contact pads 110 are conductive regions on the plug board 104 and are aligned with slots 112 on the plug housing 102. Electrical contacts may be soldered to contact pads 110 and extend through slots 112. These electrical contacts will make electrical contact with pins in an outlet. The pair arrangements are shown on the plug board depicting pairs 1-2, 3-6, 4-5 and 7-8, where pair 3/6 is referred to as a split pair because pair 4/5 is interposed between pair 3/6.

The plug board 104 also includes secondary circuit traces 114. The placement of the primary circuit traces 108 and the secondary circuit traces 114 controls the amount of crosstalk between pairs so that NEXT levels between pairs is set to predefined values.

To effectively test telecommunications components for compliance with category 5e and category 6 requirements, an embodiment of the invention uses three test plugs for category 5e and five test plugs for category 6 tuned in the following manner.

| Pair combination | Level | NEXT Limit dB |
|---|---|---|
| Test Plug #1 - Category 5e | | |
| 3/6-4/5 | low | 34.4 |
| 1/2-3/6 | low | 42 |
| 3/6-7/8 | low | 42 |
| 1/2-4/5 | low | 50 |
| 4/5-7/8 | low | 50 |
| 1/2-7/8 | low | 60 |
| Test Plug #2 - Category 5e | | |
| 3/6-4/5 | high | 37.6 |
| Test Plug #3 - Category 5e | | |
| 1/2-3/6 | high | 50 |
| 3/6-7/8 | high | 50 |
| 1/2-4/5 | high | 70 |

-continued

| Pair combination | Level | NEXT Limit dB |
|---|---|---|
| 4/5-7/8 | high | 70 |
| Test Plug #1 - Category 6 | | |
| 3/6-4/5 | low | 36.4 |
| Test Plug #2 - Category 6 | | |
| 3/6-4/5 | middle | 37 |
| Test Plug #3 - Category 6 | | |
| 3/6-4/5 | high | 37.6 |
| Test Plug #4 - Category 6 | | |
| 1/2-3/6 | low | 46.5 |
| 3/6-7/8 | low | 46.5 |
| 1/2-4/5 | low | 57 |
| 4/5-7/8 | low | 57 |
| 1/2-7/8 | low | 60 |
| Test Plug #5 - Category 6 | | |
| 1/2-3/6 | high | 49.5 |
| 3/6-7/8 | high | 49.5 |
| 1/2-4/5 | high | 70 |
| 4/5-7/8 | high | 70 |

The desired NEXT levels are obtained by adjusting the position and/or dimensions (e.g. length, width, thickness) of the primary circuit traces 108 and the secondary circuit traces 114. The primary circuit traces 108 may be characterized as transmitting the information signal (e.g., voice, data) from the wire connection points 106 to the contact pads 110. The secondary circuit traces 114 are shunt or stump connections that do not provide a connection for the information signal. The primary circuit traces and/or the secondary circuit traces provide reactive (e.g., inductive and/or capacitive) coupling between signal paths corresponding to twisted pairs. By adjusting the location and/or dimensions of the primary circuit traces and/or the secondary circuit traces, the desired NEXT levels may be obtained to create the three category 5e test plugs and the five category 6 test plugs described above.

Using a plug board 104 to establish the desired NEXT levels between pairs reduces, if not eliminates, the variability in existing plugs due to placement of wires. The circuit traces on the plug board may also be adjusted to provide specified return loss, far end crosstalk (FEXT) and balance.

The NEXT limits provided above for the various test plugs are exemplary and are not intended to limit the invention. An embodiment of the invention provides test plugs having NEXT values adjusted to different levels within a standards-defined range. This allows the telecommunications components to be tested across the standards-defined range with a minimum number of test plugs.

The plug 100 may also be used as a plug available to consumers, rather than solely as a test plug. The plug would be tuned to meet certain NEXT levels between pairs depending on consumer requirements. For example, if a consumer needed a plug marginally better than category 5e, the plug could be tuned to meet the low end NEXT requirements of category 6. Alternatively, the plug could be tuned to meet the high level NEXT requirements of category 6. The use of plug board 104 reduces variability is terminating wires in the plug which leads to less rework of plugs by the manufacturer and fewer failures in the field.

Although the plug 100 has been described for use with a cable having eight wires arranged in four pairs, it is understood that the plug board 104 may be configured for use with any number of pairs such as 1, 2, 3 or 5 pair configurations.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A set of telecommunications test plugs for use with twisted pair cable having N wires arranged in N/2 pairs, the set of telecommunications test plugs comprising:
    a first plug housing;
    a first plug board contained within the first plug housing, the first plug board including:
        a plurality of wire connection points, each for establishing electrical connection with one of said N wires;
        a plurality of contact pads;
        a plurality of circuit traces including primary circuit traces establishing electrical connection between the wire connection points and the contact pads; said circuit traces being positioned to establish first predefined near end crosstalk between at least two of said pairs, said first predefined near end crosstalk being at a first level of a first defined range; and
        a plurality of electrical contacts in electrical connection with the contact pads, the electrical contacts extending through slots for in the first plug housing, the electrical contacts for making electrical contact with pins in an outlet;
    a second plug housing;
    a second plug board contained within the second plug housing, the second plug board including:
        a plurality of wire connection points, each for establishing electrical connection with one of said N wires;
        a plurality of contact pads;
        a plurality of circuit traces including primary circuit traces establishing electrical connection between the wire connection points and the contact pads;
        said circuit traces being positioned to establish second predefined near end crosstalk between said at least two of said pairs, said second predefined near end crosstalk being at a second level of a second defined range, said second level being higher than said first level.

2. The set of telecommunications test plugs of claim 1 wherein:
    said first defined range is the same as said second defined range.

3. The set of telecommunications test plugs of claim 2 wherein:
    said first defined range and said second defined range are defined by Category 5e.

4. The set of telecommunications test plugs of claim 3 wherein:
    said first predefined near end crosstalk corresponds to near end crosstalk between a split pair of wires and the second predefined near end crosstalk corresponds to near end crosstalk between said split pair of wires.

5. The set of telecommunications test plugs of claim 3 wherein:
    said first predefined near end crosstalk corresponds to near end crosstalk between a split pair of wires and at least one additional pair of wires and said second predefined near end crosstalk corresponds to near end crosstalk between said split pair of wires.

6. The set of telecommunications test plugs of claim 2 wherein:

said first defined range and said second defined range are defined by Category 6.

7. The set of telecommunications test plugs of claim 6 wherein:
said first predefined near end crosstalk corresponds to near end crosstalk between a split pair of wires and the second predefined near end crosstalk corresponds to near end crosstalk between said split pair of wires.

8. A telecommunications plug for use with twisted pair cable having N wires arranged in N/2 pairs, the telecommunications plug comprising:
a first plug housing;
a first plug board contained within the first plug housing, the first plug board including:
a plurality of wire connection points, each for establishing electrical connection with one of said N wires;
a plurality of contact pads;
a plurality of circuit traces including primary circuit traces establishing electrical connection between the wire connection points and the contact pads;
said circuit traces being positioned to establish first predefined near end crosstalk between at least two of said pairs, said first predefined near end crosstalk (NEXT) being at a first level of a first defined range; and
a plurality of electrical contacts in electrical connection with the contact pads, the electrical contacts extending through slots for in the first plug housing, the electrical contacts for making electrical contact with pins in an outlet.

9. The telecommunications plug of claim 8, wherein said circuit traces are positioned to provide a predefined return loss.

10. The telecommunications plug of claim 8, wherein said circuit traces are positioned to provide a predefined far end crosstalk (FEXT).

11. The telecommunications plug of claim 8, wherein said circuit traces are positioned to provide a predefined balance.

12. The telecommunications plug of claim 8, wherein said circuit traces are positioned to meet low end NEXT requirements of category 6.

13. The telecommunications plug of claim 8, wherein said circuit traces are positioned to meet high end NEXT requirements of category 6.

14. A pair of telecommunications plugs for use with twisted pair cable having N wires arranged in N/2 pairs, the telecommunications plugs comprising:
a first plug housing;
a first plug board contained within the first plug housing, the first plug board including:
a plurality of wire connection points, each for establishing electrical connection with one of said N wires;
a plurality of contact pads;
a plurality of circuit traces including primary circuit traces establishing electrical connection between the wire connection points and the contact pads;
said circuit traces being positioned to establish first transmission levels between at least two of said pairs, said first transmission levels being at a first level of a first defined range; and
a plurality of electrical contacts in electrical connection with the contact pads, the electrical contacts extending through slots for in the first plug housing, the electrical contacts for making electrical contact with pins in an outlet;
a second plug housing;
a second plug board contained within the second plug housing, the second plug board including:
a plurality of wire connection points, each for establishing electrical connection with one of said N wires;
a plurality of contact pads;
a plurality of circuit traces including primary circuit traces establishing electrical connection between the wire connection points and the contact pads;
said circuit traces being positioned to establish second transmission levels between at least two of said pairs, said second transmission levels being at a second level of a first defined range, the second level being different than the first level.

15. The telecommunications plugs of claim 14, wherein said circuit traces on one of said first plug board and said second plug board are positioned to provide a predefined return loss.

16. The telecommunications plugs of claim 14, wherein said circuit traces on one of said first plug board and said second plug board are positioned to provide a predefined far end crosstalk (FEXT).

17. The telecommunications plugs of claim 14, wherein said circuit traces on one of said first plug board and said second plug board are positioned to provide a predefined balance.

18. The telecommunications plugs of claim 14, wherein said circuit traces on said first plug board are positioned to meet low end requirements of category 6 and said circuit traces on said second plug board are positioned to meet high end requirements of category 6.

19. The telecommunications plugs of claim 14 wherein the transmission levels are defined by near end crosstalk.

* * * * *